United States Patent [19]

Blytas et al.

[11] Patent Number: 5,756,772

[45] Date of Patent: May 26, 1998

[54] REDUCING POLYETHERCYCLICPOLYOL METAL ADHESION

[75] Inventors: George Constantine Blytas; Arthur Herman Hale, both of Houston, Tex.

[73] Assignee: Shell Oil Company, Houston, Tex.

[21] Appl. No.: 788,486

[22] Filed: Jan. 28, 1997

Related U.S. Application Data

[63] Continuation of Ser. No. 341,714, Nov. 18, 1994, abandoned.

[51] Int. Cl.[6] ................................................. C07D 319/12
[52] U.S. Cl. .......................... 549/378; 549/378; 507/136; 507/137; 507/139; 507/140; 507/145
[58] Field of Search ........................... 549/378; 507/136, 507/137, 139, 140, 145

[56] References Cited

U.S. PATENT DOCUMENTS 5,371,244  12/1994  Blytas ....................................... 549/378
5,412,115   5/1995  Zuzich et al. ............................. 549/378

Primary Examiner—Samuel A. Acquah
Attorney, Agent, or Firm—Fredrik Marlowe

[57] ABSTRACT

Reduction of the adhesion of polyethercyclicpolyol (PECP) to metals by preparing the PECP by condensing polyol molecules by reactive distillation and replacing part of the polyol with an alcohol of lower hydroxyl content than the polyol.

5 Claims, No Drawings

REDUCING POLYETHERCYCLICPOLYOL METAL ADHESION

This is a continuation of application Ser. No. 08/341,714, filed Nov. 18, 1994 now abandoned.

BACKGROUND OF THE INVENTION

Polyethercyclicpolyol (PECP) has been tested as an additive for aqueous drilling muds. In this test, the performance of PECP was evaluated and found to match or exceed expectations with regard to those characteristics which were used in optimizing its molecular structure and properties. The five performance criteria that were used to guide and optimize synthesis efforts were (1) fluid loss inhibition, (2) inhibition of shale swelling, (3) inhibition of cuttings dispersion, (4) thickness of filter cake, and (5) toxicity. The performance of PECP base muds in the field test was superior in all five aspects for which experimental testing had been conducted. However, it was found that in the tests, drilling muds containing 5–10% by weight PECP tend to adhere to stabilizer surfaces. Stabilizers are large, metallic vanes, 8–10 ft long, attached radially from the drilling shaft. The tendency of PECP-containing muds to adhere to the stabilizers causes frictional resistance to drilling and slows the rate of penetration. This effect also results in "bit-balling," i.e., formation of masses of drilling-mud containing the cuttings which stick to the drilling bit.

SUMMARY OF THE INVENTION

Accordingly, responsive to the above problem in the art, the present invention is directed to means for reducing the adhesive tendency of PECP towards metal. It has been found that the cause of this effect can be attributed at least in part to two factors: (1) higher than optimal PECP dosage and (2) adhesion of the polar hydroxyl groups to the metallic surface. Accordingly, the present invention, in solving this problem in the art, optimizes the PECP dosage and renders the PECP more hydrophobic by reducing the hydroxyl to carbon ratio in a structure. This is done by preparing the PECP by reactive distillation of a polyol which is replaced at least in part by alcohol which has a lower hydroxyl content than the polyol.

DESCRIPTION OF PREFERRED EMBODIMENTS

Polyethercyclicpolyols (PECP) are prepared by condensing polyol molecules by reactive distillation. In this process, water molecules are removed and ether bonds are formed by polymerizing the monomeric glycerol. In the polymeric PECP structure, for every glycerol unit of free carbons, about 1.2 moles of water is removed, leaving 1.8 oxygen atoms either as ethers, or as hydroxyl groups. The preparation is completed by making small additions of glycerol, after at least 80% of the reaction has been completed or advancing to the degree of the hydration. Typically, three additions of glycerol are carried out during the last leg of the reaction, and the last 18–20% of the dehydration is accomplished while adding only 9–12% of the reacting glycerol.

In the preferred embodiment of the present invention the glycerol in the last one or two aliquot additions is replaced by an alcohol which has a lower hydroxyl content than glycerol. Suitable alcohols are 1,2-butanediol, octanol, tripropylene glycol, decanol, commercial detergent range alcohols such as Neodol-91 (a commercial mixture of straight chain n-alcohols with 9 to 11 methyl groups) castor oil (rich in ricinoleic acid constituents) and olive oil (rich in oleic acid constituents). The hydroxyl/carbon ratio in all these alcohols is far less than 1:1, which is the case for glycerol.

The selection of the alcohol for testing in this approach is limited by the requirement that the boiling point be sufficiently high to allow for sufficient residence time in the reaction zone of the reactive distillation unit. The two oil samples were assumed to hydrolyze at high pH into glycerol and the related fatty acid; the fatty acid proved reactive by esterification with the hydroxyl groups.

EXAMPLES

The effectiveness of the various modified PECPs and of the surfactant additives in reducing adhesion to metallic surfaces was tested by studying the spreading behavior of a thin layer of the liquid sample on standardized metal surfaces. The surfaces used were cold-rolled carbon steel 4"×12" coupons (Q-panels). On those panels a 4-mill thick layer was spread with a "doctor's blade" and the spreading behavior was recorded. The liquid phase in these tests was 50% aqueous PECP solution.

The surfactants and polysurfactants being screened were mixed with a commercial sample of PECP manufactured by Baker Performance Chemicals. The effectiveness of the various preparations and surfactant additions was obtained in terms of the service coverage of the Q-panel after 2 hours or overnight standing. Qualitatively, in those preparations that were assessed to be successful, the fluid film pulls away from the metal, leaving dry a significant portion of the surface. In several cases, the effectiveness of treatment appeared to improve with time. However, this is probably due to loss of water by evaporation. Thus, we consider the 2-hour data more meaningful. In most cases the behavior observed in a few minutes is as good a predictor of a 2-hour result.

To compare effectiveness, the results are shown on a scale of zero to 10, where zero indicates no effect and 10 indicates maximum exposure of bare metal. No 10 ratings were obtained in this study, and may be theoretically impossible to obtain with a non-negligible volume of filming solution.

From the modified PECPs, the most successful product was obtained by terminating the reaction with Neodol-91 (a commercial mixture of straight chain n-alcohols with 9 to 11 methyl groups), with a rating of 6 on a scale of zero to 10. The second best product was obtained by terminating with 1,2-butanediol (5 rating). Tripropyleneglycol and octanol provided measureable improvements also (3). Virtually all preparation modifications yielded some improvement.

The combination of hydrophobically modified PECPs with small amounts of surfactant or polysurfactant additives yields ratings of 7 to 9.

When PECP is incorporated into a drilling mud formulation, similar results are obtained.

What is claimed is:

1. A process for reducing bit-balling in the drilling of an oil well with a water base drilling fluid containing polyethercyclicpolyol comprising:

preparing the polyethercyclicpolyol by condensing polyol molecules by reactive distillation; and increasing the hydrophobicity of the polyethercyclicpolyol by replacing at least part of the polyol with an alcohol of lower hydroxyl content than glycerol.

2. The process of claim 1 wherein the alcohol is a mixture of straight chain n-alcohols each with 9 to 11 methyl groups.

3. The process of claim 1 wherein the alcohol is 1,2-butanediol.

4. The process of claim 1 where in the alcohol is tripropylene glycol.

5. The process of claim 1 wherein the alcohol is octanol.

* * * * *